US 6,730,926 B2

(12) United States Patent
Boillot et al.

(10) Patent No.: US 6,730,926 B2
(45) Date of Patent: May 4, 2004

(54) SENSING HEAD AND APPARATUS FOR DETERMINING THE POSITION AND ORIENTATION OF A TARGET OBJECT

(75) Inventors: Jean-Paul Boillot, St-Bruno (CA); Raymond Boridy, Boucherville (CA); Jacques-André Gaboury, Montréal (CA)

(73) Assignee: Servo-Robot Inc., Saint-Bruno (CA)

( * ) Notice: Subject to any disclaimer, the term of this patent is extended or adjusted under 35 U.S.C. 154(b) by 186 days.

(21) Appl. No.: 09/945,698

(22) Filed: Sep. 5, 2001

(65) Prior Publication Data

US 2003/0042440 A1 Mar. 6, 2003

(51) Int. Cl.$^7$ ................................................. G01V 8/00
(52) U.S. Cl. ............................ 250/559.23; 250/559.19; 356/623
(58) Field of Search .................. 250/208.1, 559.33, 250/559.29, 206.1, 559.22, 227.26, 559.23; 901/46, 47; 700/59, 258, 259; 318/568.16, 577; 701/28; 356/139.03, 623; 348/90; 382/153, 154

(56) References Cited

U.S. PATENT DOCUMENTS

| | | | | |
|---|---|---|---|---|
| 4,427,880 A | * | 1/1984 | Kanade et al. | 250/222.1 |
| 5,059,789 A | | 10/1991 | Salcudean | 250/206.1 |
| 5,198,876 A | | 3/1993 | Anezaki et al. | 356/375 |
| 5,461,478 A | | 10/1995 | Sakakibara et al. | 356/375 |
| 5,552,883 A | | 9/1996 | Busch-Vishniac et al. | 356/139.03 |
| 5,576,948 A | * | 11/1996 | Stern et al. | 700/59 |
| 5,621,807 A | | 4/1997 | Eibert et al. | 382/103 |
| 5,633,995 A | | 5/1997 | McClain | 395/119 |
| 5,742,394 A | | 4/1998 | Hansen | 356/375 |
| 5,767,960 A | | 6/1998 | Orman | 356/139.03 |
| 5,784,282 A | | 7/1998 | Abitbol et al. | 364/474.28 |
| 5,832,139 A | | 11/1998 | Batterman et al. | 382/291 |
| 5,856,844 A | | 1/1999 | Batterman et al. | 348/207 |
| 5,883,803 A | * | 3/1999 | Vann | 700/59 |
| 5,943,476 A | | 8/1999 | Dougherty et al. | 395/94 |
| 5,974,365 A | | 10/1999 | Mitchell | 702/150 |
| 5,987,349 A | | 11/1999 | Schulz | 600/427 |
| 5,987,591 A | * | 11/1999 | Jyumonji | 700/259 |
| 6,028,954 A | | 2/2000 | Tomita et al. | 382/154 |
| 6,038,074 A | | 3/2000 | Kitaguchi et al. | 359/618 |
| 6,064,759 A | | 5/2000 | Buckley et al. | 382/154 |
| 6,067,165 A | | 5/2000 | Matsumiya et al. | 356/401 |
| 6,081,273 A | | 6/2000 | Weng et al. | 345/425 |
| 6,094,501 A | | 7/2000 | Beatty | 382/154 |
| 6,115,128 A | | 9/2000 | Vann | 356/375 |
| 6,122,078 A | | 9/2000 | Leberl et al. | 358/474 |
| 6,133,946 A | | 10/2000 | Cavallaro et al. | 348/135 |
| 6,141,104 A | | 10/2000 | Schulz et al. | 356/375 |
| 6,151,118 A | | 11/2000 | Norita et al. | 356/376 |
| 6,175,644 B1 | | 1/2001 | Scola et al. | 382/141 |
| 6,236,735 B1 | | 5/2001 | Bjorner et al. | 382/101 |

OTHER PUBLICATIONS

Fossum, Eric R. "Image Capture Circuits in CMOS", Proceedings of International Conference on VLSI Technology and Applications, Taipei, Taiwan, Jun. 1997.*

* cited by examiner

*Primary Examiner*—Thanh X. Luu
*Assistant Examiner*—Stephen Yam
(74) *Attorney, Agent, or Firm*—McDermott, Will & Emery

(57) ABSTRACT

A sensing head for providing bi-dimensional and tri-dimensional data determinative of a position and an orientation of a target object is provided. The sensing head combines both a bi-dimensional and a tri-dimensional sensors. General illumination is associated to the bi-dimensional sensor to allow the acquisition of bi-dimensional data representative of the target object. A stripe-shaped laser light output is projected and diffused on the target object and is sensed by the tri-dimensional sensor. Tri-dimensional data is thus acquired. By proper processing of the bi-dimensional and tri-dimensional data, the position and orientation of the target object may be determined without moving the sensor head and without knowing its position and orientation.

14 Claims, 3 Drawing Sheets

SENSING HEAD AND APPARATUS FOR DETERMINING THE POSITION AND ORIENTATION OF A TARGET OBJECT

FIELD OF THE INVENTION

The present invention relates to the field of optical sensors and more particularly concerns a more efficient sensor for determining the position and orientation of a target object.

BACKGROUND OF THE INVENTION

Optical sensors are useful tools for position and orientation measurements of objects of various types and sizes.

In particular, in the automobile industry where an automobile body must be inspected for defects during the manufacturing process, such sensors are used to collect measurements of the position and orientation of selected objects on the car body. The resulting data is stored in a database for analysis. This type of inspection is carried out using an articulated robot with a laser-camera mounted on its wrist, the laser-camera providing the measurements. The robot is moved over the car body and the camera takes measurements of selected objects. The robot can move in any direction and orientation over a selected feature of the car body. However, in order to measure position and orientation, the robot has to go to the selected feature area and rotate, tilt and turn the camera in several directions in order to capture all the measurements needed for the database. Even with these robot movements, the camera will not be able to measure all the angles needed for a proper characterization of the object.

The above explained inspection process has two important drawbacks. Firstly, for a given cycle, the inspection time is lengthen by the many movements of the camera necessary in order to capture the angles needed to provide the required data. Secondly, in order to take orientation measurements, the camera must be moved in several angles. These movements are sometimes impossible because other objects can be in the way of the robot and camera. The geometry of the car body becomes a limiting factor.

There is therefore a need for an optical sensor providing the data necessary for describing the position and orientation of an object without moving the camera around during the measurement process and without knowing the orientation of the camera and the robot wrist, which is not the case of prior art devices.

SUMMARY OF THE INVENTION

In accordance with a first aspect of the present invention, there is provided a sensing head for providing bi-dimensional and tri-dimensional data determinative of a position and an orientation of a target object extending in a sensing area.

The sensing head includes a general illumination light source directed towards the sensing area, and a bi-dimensional sensor also directed towards said sensing area. The bi-dimensional sensor cooperates with the general illumination light source for acquiring the bi-dimensional data upon illumination of the target object by the general illumination light source. The bi-dimensional data is representative of an image of the target object along a plane.

The sensing head also has a laser light source, and an optical arrangement optically coupled to the laser light source for controllable projection of a light output generated by the laser light source along distinct lines extending in the plane. A tri-dimensional sensor is directed towards the sensing area for acquiring the tri-dimensional data, by sensing diffusion of the light output on the target object. The tri-dimensional data is representative of tri-dimensional coordinates of the target object along the above-mentioned lines.

A collector circuit is connected to the bi-dimensional and tri-dimensional sensors for receiving the bi-dimensional and tri-dimensional data therefrom, the collector circuit having an output for transmitting the same.

In accordance with another aspect of the present invention, there is also provided an apparatus for determining a position and an orientation of a target object extending in a sensing area.

The apparatus includes a sensing head for providing bi-dimensional and tri-dimensional data determinative of the position and orientation of the target object. The sensing head has a general illumination light source directed towards the sensing area, and a bi-dimensional sensor, also directed towards the sensing area and cooperating with the general illumination light source for acquiring the bi-dimensional data upon illumination of the target object by the general illumination light source. The bi-dimensional data is representative of an image of the target object along a plane. The sensing head further includes a laser light source and an optical arrangement optically coupled thereto for controllable projection of a light output generated by the laser light source along distinct lines extending in the plane. A tri-dimensional sensor is directed towards the sensing area for acquiring the tri-dimensional data by sensing diffusion of the light output on the target object. The tri-dimensional data is representative of tri-dimensional coordinates of the target object along the lines. The sensing head also includes a collector circuit connected to the bi-dimensional and tri-dimensional sensors for receiving the bi-dimensional and tri-dimensional data therefrom. The collector circuit has an output for transmitting the same.

The apparatus further includes a control circuit for controlling the light sources and the sensors, and a processing circuit for processing the bi-dimensional and tri-dimensional data received from the collector circuit to determine therefrom the position and orientation of the target object.

Further advantages and features of the present invention will be better understood upon reading of preferred embodiments thereof with reference to the appended drawings.

DESCRIPTION OF PREFERRED EMBODIMENTS OF THE INVENTION

Figure 1:
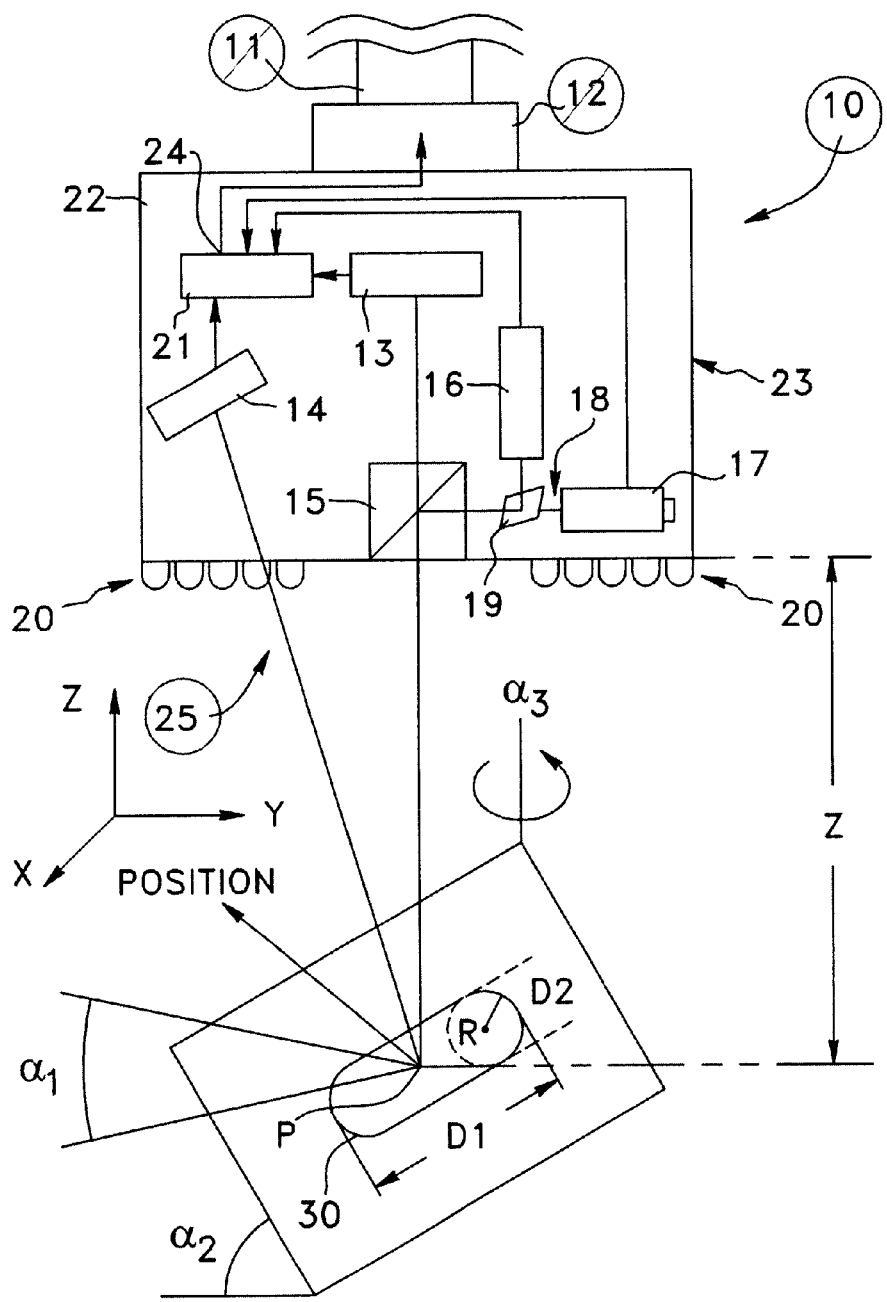
FIG. 1 is a schematic representation of a sensing head according to a preferred embodiment of the invention.
Figure 2:
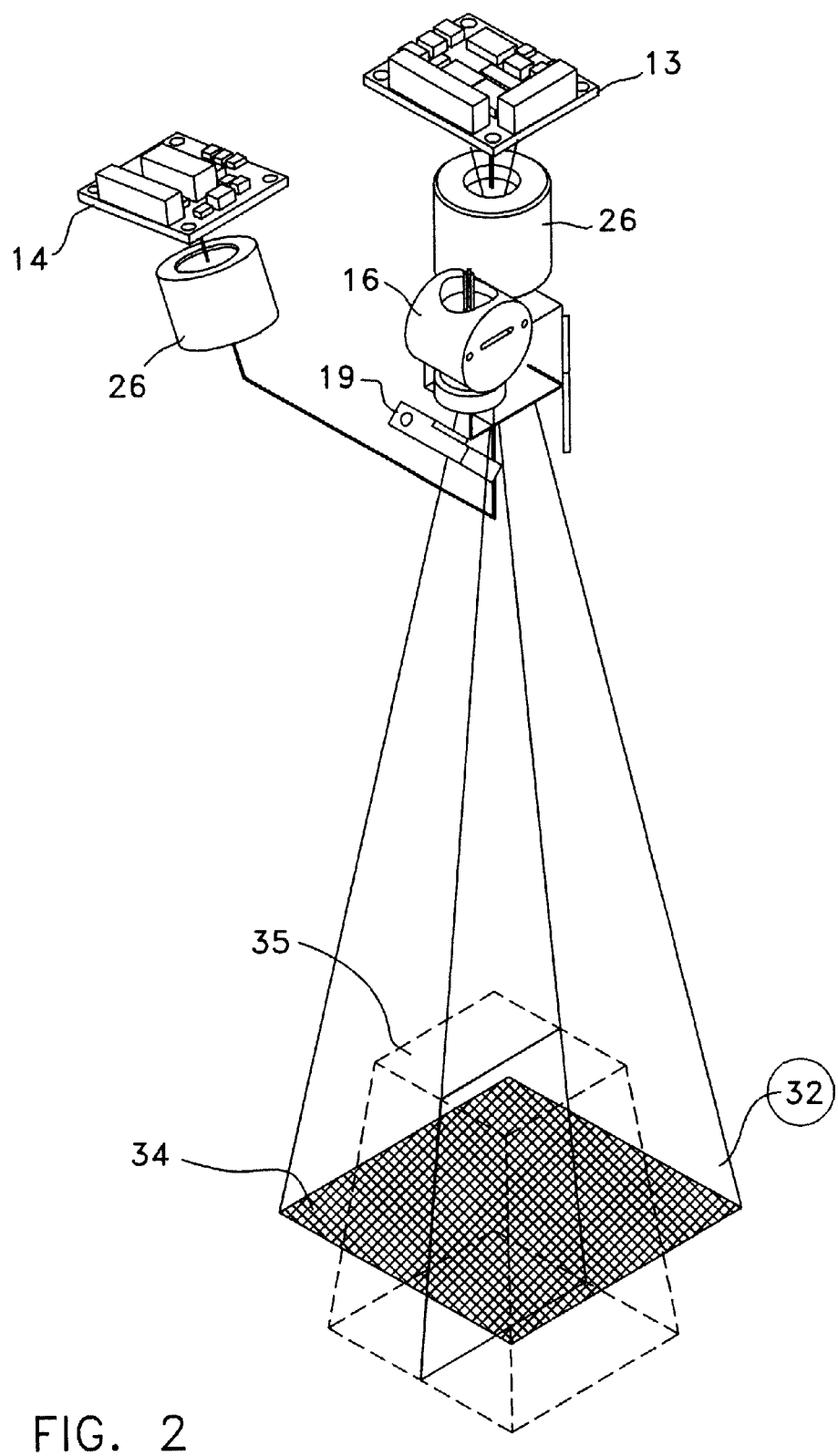
FIG. 2 is a perspective view of the sensing head of FIG. 1 showing the fields of view of the respective sensors.

With reference to FIGS. 1 and 2, there is shown a sensing head 10 for providing data determinative of a position and an orientation of a target object 30 extending in a sensing area 32. The data is provided in two sets: bi-dimensional data representative of an image of the target object 30 along a given plane 34, and tri-dimensional data representative of tri-dimensional coordinates of the object 30 along sample lines extending in the plane 34. Upon proper processing, this data may be used to determine the required position and orientation of the target object 30. The plane 34 corresponds to the field of view of the bi-dimensional sensor, as better shown in FIG. 2.

The sensing head 10 therefore has two sensors, a bi-dimensional sensor 13 and a tri-dimensional sensor 14. The bi-dimensional sensor 13 is directed towards the sensing area and cooperates with a general illumination light source 20 also directed towards the sensing area. Upon illumination of the target object 30 by the general illumination light source 20, a bi-dimensional image of the object along a plane perpendicular to the line of view of the bi-dimensional sensor 13 is acquired, defining the bi-dimensional data. The general illumination light source preferably includes an arrangement of LEDs facing the sensing area. In the preferred embodiment red colored LEDs are used to better compensate for ambient light.

The tri-dimensional data is acquired through the use of a laser light source 16 generating a light output. An optical arrangement is optically coupled to the laser light source for controllable projection of the light output along distinct lines extending in the plane defined above. Preferably, the laser source 16 is a laser stripe diode assembly so that the light output it generates is stripe-shaped. In the illustrated embodiment, the optical arrangement includes a rotating mirror 19 positioned across the path of the light output, controllable between distinct angular positions. Each of these angular positions allows the projection of the light output along one of the distinct lines for which the tri-dimensional data is acquired. Minimally, data should be acquired along at least two such lines. In the preferred embodiment, three lines are used. A galvanometer 17 coupled to the rotating mirror 19 through a rotating shaft 18 controls the angular position of the mirror 19.

Also in the preferred embodiment, a prism 15 is provided in the path of the light output after the mirror 19 to redirect the output towards the sensing area.

The laser source 16 may be of a flying spot type provided in such a case with a suitable spot moving mechanism (not shown in the Figure).

The tri-dimensional sensor 14 is directed towards the sensing area 32, and sees a volumetric field of view 35 (shown in FIG. 2). The tri-dimensional data is acquired by sensing diffusion of the light output on the target object 30. Standard optical triangulation techniques allow the range of the object along each line to be determined from this data. Any appropriate optical components such as lenses 26 (FIG. 2) may additionally be used to properly focus incoming signals on the sensors 13 and 14.

Preferably, both the bi-dimensional and tri-dimensional sensors are CMOS optical sensors, but any other appropriate type of sensor such as a CCD camera may also be used.

A collector circuit 21 is connected to the bi-dimensional and tri-dimensional sensors 13 and 14, and receives the bi-dimensional and tri-dimensional data therefrom. The collector circuit has an output 24 for transmitting this data.

In the preferred embodiment, a casing 23 encloses the laser light source 16, the optical arrangement, the sensors 13 and 14 and the collector circuit 21. The casing 23 has a bottom opening 25 through which the light output and the view line of each sensor pass. Also preferably, the casing 23 is provided with a fastening member for attachment to a robot arm, for moving the sensing head from one target object to another between inspection cycles.

Advantageously, the sensing head according to the present invention allows the acquisition of all the data necessary for inspection in a short time, without having to move the sensing head around during the inspection cycle and without the need to know the camera orientation.

Figure 3:
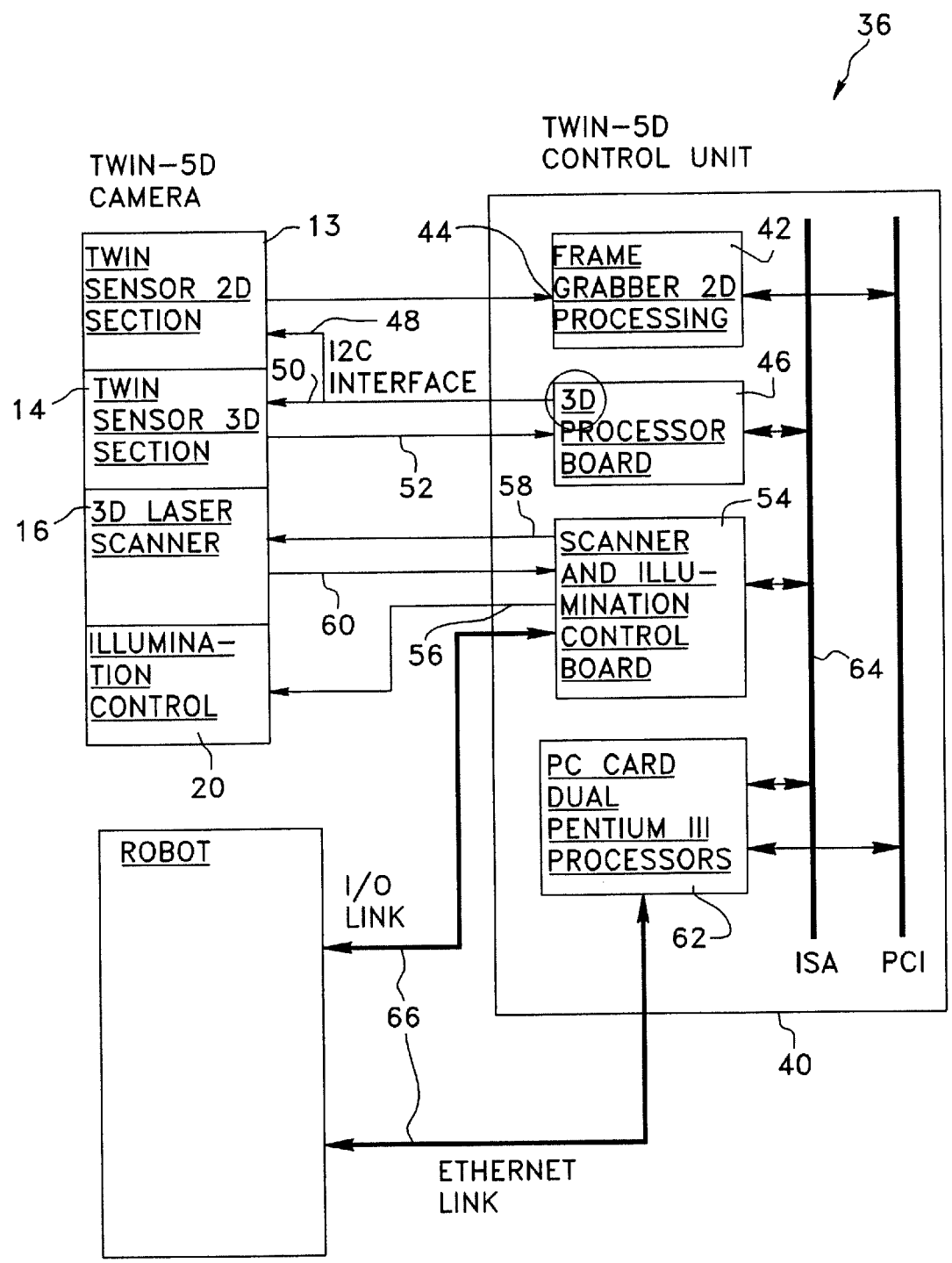
FIG. 3 is a bloc diagram of an apparatus according to a preferred embodiment of the invention.

In accordance with another aspect of the present invention, there is provided an apparatus 36 for determining the position and orientation of a target object. FIG. 3 shows a bloc diagram for such an apparatus 36.

The apparatus 36 includes a sensing head 10 as described above. Control and processing circuits are respectively provided for controlling the light sources 16 and 20 and the sensors 13 and 14, and processing the bi-dimensional and tri-dimensional data received from the collector circuit 21 to determine therefrom the position and orientation of the target object.

In the preferred embodiment, the control and the processor circuits are combined into a control unit 40. The control unit 40 has a frame grabber 42, a 3D processor board 46, a scanner and illumination board 54, a processor 62, and a bus structure 64. The frame grabber 42 has an input 44 receiving the bi-dimensional data from the bi-dimensional sensor. The 3D processor board 46 has control outputs 48 and 50 respectively connected to the bi-dimensional and tri-dimensional sensors 13 and 14 and an input 52 receiving the tri-dimensional data from the tri-dimensional sensor 14. The scanner and illumination control board 54 has control outputs 56 and 58 respectively connected to the light sources 20 and 16 and an input 60 receiving positional information from the optical arrangement. The bus structure 64 interconnects the processor 62 with the frame grabber 42, 3D processor board 46 and illumination control board 54.

Preferably, the scanner and illumination control board 54 and the processor 62 have interfaces 66 for robot communication.

The frame grabber, the 3D processing, the scanner and illumination control and the processor function could be all embodied in a single board.

In the preferred embodiment of the invention, the data processing for determining the position and orientation of the object from the collected bi-dimensional and tri-dimensional data is as follows.

All computations made internally to the sensing head are made in a fixed point of reference with respect to the casing of the sensing head, called mechanical reference. The use of a same reference point for both sensors and for all positions in the plane allows a thorough combining of all the data acquired by the sensing head and determines therefrom the position and orientation of the target object.

Each pixel of the bi-dimensional sensor is represented by a curve in space corresponding to the field of view of this pixel. Depending on the required precision and the quality of the optical components used, this curve may be a straight line, in its simplest form, or of a more complex nature such as quadratic, spline, etc. This curve for each pixel may be represented mathematically by the following:

$$x_{mechanical} = f(z_{mechanical})$$

$$y_{mechanical} = f(z_{mechanical})$$

In the case of a straight line, each pixel may be represented by the following equations:

$$x_{mechanical} = m_x z_{mechanical} + b_x$$

$$y_{mechanical} = m_y z_{mechanical} + b_y$$

There are therefore four matrices to consider, one for each coefficient.

The bi-dimensional image data processing determines the pixels of interest, such as, for example, the pixels holding the center point and the extremities of the target object. The row and column numbers i and j of these pixels are then used to obtain the proper matrix coefficients. In the case of data processing with sub-pixel resolution, the row and column numbers i and j take fractional values and an interpolation of the corresponding rows and columns is done in the matrix.

In the tri-dimensional case, the tri-dimensional sensor is first calibrated for each position of a laser line, itself determined by the position of the rotating mirror. The calibration process involves two steps. Firstly, two tables are used to transform coordinates from the (i,j) reference system of the sensor to ($y_{optical}$, $z_{optical}$) coordinates in a "laser plane" which is parallel to the light output. Secondly, since the laser plane is mobile, further tables or equations need to be used to further transform the coordinates from the optical reference system to the mechanical reference system. This transformation takes into account the rotation and translation of the origin of the mechanical reference system with respect to the various optical reference systems.

The tri-dimensional data processing preferably processes the signal before conversion from the optical reference system to the mechanical reference system. Only the points of interest then need to be converted in the manner described above.

The bi-dimensional and tri-dimensional data then need to be properly combined in order to extract the desired information.

In the preferred embodiment, the tri-dimensional data includes measurements along at least two laser lines. For each of these lines, at least two points belonging to the object's surface are obtained from the image processing. The coordinates of these points are transformed from the optical reference system to the mechanical reference system. The surface of the object is then mathematically represented in this new reference system. By way of example, let the object be an opening in a plane surface as would be the case for the inspection of automobile parts. The equation of the best plane passing through all the obtained points is computed and represented by an equation in the form of:

$$z_{mechanical} = m_x x_{mechanical} + m_y y_{mechanical} + b$$

From the bi-dimensional image, the equations for the pixels of interest are obtained as described above. The intersection of both bi-dimensional and tri-dimensional fields of view is then obtained by resolving a system of three equations and three unknown formed by the two straight lines and the above plane. This processing is done for all points of interest. The center pixel yields the coordinates ($x_{mechanical}$, $y_{mechanical}$, $z_{mechanical}$) of the target object, corresponding to point P in FIG. 1. The extremity pixels are used to determine the object's size, compensate for its orientation and for the distance between the object and the bi-dimensional sensor. For the plane equation above, two of three degrees of freedom are determined with regards to the orientation of the object by computing the directing cosines of the normal to the plane. The third degree of freedom is fixed by the bi-dimensional imagery and corresponds to the orientation of the object in the plane. All the variables shown in FIG. 1 (R, D1, D2, $\alpha 1$, $\alpha 2$, $\alpha 3$) may therefore be obtained from a minimal amount of data.

In summary, the present invention provides a sensing head that can be simply positioned by a robotic arm over a target object, for example on a car body, at any angle and still be able to collect accurate measurements of its X, Y, Z position and orientation without having to move the sensing head any further and without the need of knowing the orientation of the camera. The robot still has to move the sensing head to the feature to be measured, but it does not have to move during measurement. A five-dimensional picture is taken from a known position and six coordinate values are then computed by the system using special mathematics based on a novel optical geometry design.

In the preferred embodiment, the sensing head is mounted on the articulated robot wrist. The articulated robot positions the sensing head over a target object. The sensing head takes a bi-dimensional picture and performs a tri-dimensional scan. The bi-dimensional picture may then be correlated with the tri-dimensional scan and the result is the generation of six coordinate values. These six computed values are sent to the database.

The robot then moves on to another selected object and the above process is performed again. The data collected is cumulated in a database for analysis purposes.

It should be understood that instead of moving the camera, the camera could be set in fixed position and the robot could position the feature to be measured in front of the camera.

The present invention in its preferred embodiment provides the following advantageous features. The combination of the bi-dimensional image and the tri-dimensional scanned surface by a moving laser stripe in the same camera enables the measurement of the X, Y, Z position and orientation in space, relative to a known coordinate reference system. The sensing performs all the measurements without knowing the position or angle of the articulated robot. All the angles and absolute positions are measured and calculated by the sensing head without having to move the robot or know it's spatial orientation and position. The tri-dimensional images are obtained by a second sensor, thus separating the optical triangulation from the bi-dimensional optics and bi-dimensional sensor. In other systems similar to this one, the tri-dimensional images are obtained by doing the triangulation on the bi-dimensional sensor and therefore the bi-dimensional and tri-dimensional images are generated by the same sensor. The advantage of having a separate sensor for the bi-dimensional and tri-dimensional images is that the processing for each one does not have to cope with the artifacts of the other one.

While embodiments of this invention have been illustrated in the accompanying drawings and described above, it will be evident to those skilled in the art that changes and modifications may be made therein without departing from the essence of this invention. All such modifications or variations are believed to be within the scope of the invention as defined by the claims appended hereto.

What is claimed is:

1. A sensing head for providing bi-dimensional and tri-dimensional data determinative of a position, dimensions and an orientation of a target object extending in a sensing area, comprising:

a general illumination light source directed towards the sensing area;

a bi-dimensional sensor directed towards said sensing area and cooperating with the general illumination light source for acquiring the bi-dimensional data upon illumination of the target object by said general illu mination light source, said bi-dimensional data being representative of an image of the target object along a plane;

a laser light source;

an optical arrangement optically coupled to the laser light source for controllable projection of a light output generated by the laser light source along distinct lines extending in said plane, the optical arrangement having an optical element through which the image of the target object acquired by the bi-dimensional sensor and the light output from the laser light source pass in a same reference axis;

a tri-dimensional sensor directed towards said sensing area for acquiring the tri-dimensional data by sensing diffusion of the light output on the target object, said tri-dimensional data being representative of tri-dimensional coordinates of said target object along said lines;

a collector circuit connected to the bi-dimensional and tri-dimensional sensors for receiving the bi-dimensional and tri-dimensional data therefrom and having an output for transmitting the same after a single 2D acquisition and a single 3D scan; and a casing enclosing said laser light source, optical arrangement, bi-dimensional and tri-dimensional sensors and collector circuit, the casing having a bottom opening through which the light output and a view line of each sensor pass, the general illumination light source being disposed next to the bottom opening, whereby the sensing head forms a unitary unit adapted to provide all the bi-dimensional and tri-dimensional data without any displacement of the sensing head.

2. The sensing head according to claim 1, wherein the general illumination light source comprises an arrangement of LEDs facing the sensing area.

3. The sensing head according to claim 2, wherein said LEDs generate red colored general illumination.

4. The sensing head according to claim 1, wherein said bi-dimensional sensor comprises a CMOS optical sensor.

5. The sensing head according to claim 1, wherein said laser light source comprises a laser stripe diode assembly, the light output generated by said laser light source being stripe-shaped.

6. The sensing head according to claim 5, wherein the optical arrangement comprises a controllable rotating mirror across a path of the light output, said mirror having distinct angular positions, each of which corresponding to a projection of the light output along one of the distinct lines extending in the plane.

7. The sensing head according to claim 6, wherein the optical arrangement further comprises a galvanometer connected to the collector circuit and coupled to the rotating mirror for setting said rotating mirror in each of said angular positions.

8. The sensing head according to claim 1, wherein said tri-dimensional sensor comprises a CMOS optical sensor.

9. The sensing head according to claim 1, wherein the optical element comprises a prism extending between the bi-dimensional sensor and the sensing area.

10. The sensing head according to claim 1, wherein the casing is provided with a fastening member for attachment to a robot arm.

11. An apparatus for determining a position, dimensions and an orientation of a target object extending in a sensing area, comprising:

a sensing head for providing bi-dimensional and tri-dimensional data determinative of said position, dimensions and orientation of the target object, comprising:

a general illumination light source directed towards the sensing area;

a bi-dimensional sensor directed towards said sensing area and cooperating with the general illumination light source for acquiring the bi-dimensional data upon illumination of the target object by said general illumination light source, said bi-dimensional data being representative of an image of the target object along a plane;

a laser light source;

an optical arrangement optically coupled to the laser light source for controllable projection of a light output generated by the laser light source along distinct lines extending in said plane, the optical arrangement having an optical element through which the image of the target object acquired by the bi-dimensional sensor and the light output from the laser light source pass in a same reference axis;

a tri-dimensional sensor directed towards said sensing area for acquiring the tri-dimensional data by sensing diffusion of the light output on the target object, said tri-dimensional data being representative of tri-dimensional coordinates of said target object along said lines; and a collector circuit connected to the bi-dimensional and tri-dimensional sensors for receiving the bi-dimensional and tri-dimensional data therefrom and having an output for transmitting the same after a single 2D acquisition and a single 3D scan;

control means for controlling the light sources and the sensors; and processing means for processing said bi-dimensional and tri-dimensional data received from the collector circuit to determine therefrom the position, dimensions and orientation of the target object, whereby the sensing head forms a unitary unit adapted to provide all the bi-dimensional and tri-dimensional data without any displacement of the sensing head.

12. The apparatus according to claim 11, wherein the control means and the processing means are combined into a control unit comprising a frame grabber having an input receiving the bi-dimensional data from the bi-dimensional sensor, a 3D processor board having control outputs connected to the bi-dimensional and tri-dimensional sensors and an input receiving the tri-dimensional data from the tri-dimensional sensor, a scanner and illumination control board having control outputs connected to the light sources and an input receiving positional information from the optical arrangement, a processor, and a bus structure interconnecting the processor with the frame grabber, 3D processor board and illumination control board.

13. The apparatus according to claim 12, wherein the scanner and illumination control board and the processor have interfaces for robot communication.

14. A sensing head for providing bi-dimensional and tri-dimensional data determinative of a position, dimensions and an orientation of a target object extending in a sensing area, comprising:

an arrangement of LEDs directed towards the sensing area for general illumination of the target object;

a first CMOS sensor directed towards said sensing area and cooperating with the general illumination light source for acquiring the bi-dimensional data upon illumination of the target object by said general illumination light source, said bi-dimensional data being representative of an image of the target object along a plane;

a laser light source;

an optical arrangement optically coupled to the laser light source for controllable projection of a light output generated by the laser light source along a line extending in said plane, the optical arrangement having a prism through which the image of the target object acquired by the first multi-dimensional sensor and the light output from the laser light source pass in a same reference axis;

a second CMOS sensor directed towards said sensing area for acquiring the tri-dimensional data by sensing diffusion of the light output on the target object, said tri-dimensional data being representative of tri-dimensional coordinates of said target object along said line determinable by triangulation;

a collector circuit connected to the first and second CMOS sensors for receiving the bi-dimensional and tri-dimensional data therefrom and having an output for transmitting the same after a single 2D acquisition and a single 3D scan; and a casing enclosing said arrangement of LEDs, optical arrangement, first and second CMOS sensors and collector circuit, the casing having a bottom opening through which the light output and a view line of each sensor pass, the arrangement of LEDs being disposed next to the bottom opening, whereby the sensing head forms a unitary unit adapted to provide all the bi-dimensional and tri-dimensional data without any displacement of the sensing head.

* * * * *